(12) United States Patent
Lu et al.

(10) Patent No.: US 11,320,691 B2
(45) Date of Patent: May 3, 2022

(54) MANUFACTURING METHOD OF DISPLAY SUBSTRATE, DISPLAY SUBSTRATE AND DISPLAY DEVICE

(71) Applicant: BOE Technology Group Co., Ltd., Beijing (CN)

(72) Inventors: Jiangnan Lu, Beijing (CN); Shi Shu, Beijing (CN); Kang Guo, Beijing (CN); Qi Yao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 248 days.

(21) Appl. No.: 16/508,833

(22) Filed: Jul. 11, 2019

(65) Prior Publication Data

US 2020/0033675 A1    Jan. 30, 2020

(30) Foreign Application Priority Data

Jul. 26, 2018   (CN) .......................... 201810834939.6

(51) Int. Cl.
| | | |
|---|---|---|
| *G02F 1/1335* | (2006.01) | |
| *G02B 5/30* | (2006.01) | |
| *G02F 1/1333* | (2006.01) | |
| *G02F 1/1368* | (2006.01) | |
| *G02F 1/1334* | (2006.01) | |

(52) U.S. Cl.
CPC .. *G02F 1/133528* (2013.01); *G02F 1/133516* (2013.01); *G02B 5/3058* (2013.01); *G02F 1/1368* (2013.01); *G02F 1/13345* (2021.01); *G02F 1/133357* (2021.01); *G02F 1/133519* (2021.01); *G02F 1/133548* (2021.01); *H01J 2329/4669* (2013.01)

(58) Field of Classification Search
CPC ............. G02B 5/3058; G02F 1/133548; G02F 1/133357; G02F 2001/136222; G02F 1/133519; G02F 1/133345; H01J 2329/4669
See application file for complete search history.

(56) References Cited

U.S. PATENT DOCUMENTS

| | | | | |
|---|---|---|---|---|
| 6,512,562 | B1* | 1/2003 | Kobayashi | G02B 1/105 349/122 |
| 2004/0227895 | A1* | 11/2004 | Yoo | G02F 1/1345 349/152 |
| 2006/0066946 | A1* | 3/2006 | Liu | G02B 1/105 359/487.05 |
| 2008/0218656 | A1* | 9/2008 | Kim | G02F 1/133536 349/62 |

(Continued)

*Primary Examiner* — Michael H Caley
*Assistant Examiner* — Jonathan Y Jung
(74) *Attorney, Agent, or Firm* — Fay Sharpe LLP

(57) ABSTRACT

Provided are a manufacturing method of a display substrate, a display substrate and a display device, which belongs to the field of display technologies. The manufacturing method of the display substrate includes: forming a first planarization layer on a base substrate on which a patterned film layer is formed; forming a first buffer layer on the side, away from the base substrate, of the first planarization layer; forming a second buffer layer on the side, away from the base substrate, of the first buffer layer; and forming a Wire Grid Polarizer (WGP) on the side, away from the base substrate, of the second buffer layer.

17 Claims, 17 Drawing Sheets

(56) References Cited

U.S. PATENT DOCUMENTS

| | | | |
|---|---|---|---|
| 2009/0231529 A1* | 9/2009 | Aota | G02F 1/134363 349/123 |
| 2012/0114906 A1* | 5/2012 | Yoo | B29C 39/006 428/156 |
| 2012/0140148 A1* | 6/2012 | Kadowaki | G02B 5/3058 349/64 |
| 2014/0159026 A1* | 6/2014 | Okumoto | H01L 51/0004 257/40 |

* cited by examiner

MANUFACTURING METHOD OF DISPLAY SUBSTRATE, DISPLAY SUBSTRATE AND DISPLAY DEVICE

CROSS-REFERENCE TO RELATED APPLICATION

This application claims priority to Chinese Patent Application No. 201810834939.6 filed on Jul. 26, 2018 and entitled "MANUFACTURING METHOD OF DISPLAY SUBSTRATE, DISPLAY SUBSTRATE AND DISPLAY DEVICE", the entire contents of which are incorporated herein by reference.

TECHNICAL FIELD

The present disclosure relates to the field of display technology, and in particular to a manufacturing method of a display substrate, a display substrate and a display device.

BACKGROUND

During manufacture of a liquid crystal display device, a Wire Grid Polarizer (WGP) is usually adopted to replace a polarizer disposed on a conventional display substrate, to realize ultra-thinness of the liquid crystal display device.

The process of forming a display substrate in a liquid crystal display device includes: first, forming a planarization layer on a base substrate on which a patterned film layer is formed; forming a buffer layer on the side, away from the base substrate, of the planarization layer; and forming a WGP on the side, away from the base substrate, of the buffer layer.

SUMMARY

The present disclosure provide a manufacturing method of a display substrate, a display substrate and a display device. The technical solutions are as follows.

In an aspect, there is provided a manufacturing method of a display substrate, comprising:

forming a first planarization layer on a base substrate on which patterned film layer is formed;

forming a first buffer layer on a side, away from the base substrate, of the first planarization layer;

forming a second buffer layer on a side, away from the base substrate, of the first buffer layer; and forming a Wire Grid Polarizer (WGP) on a side, away from the base substrate, of the second buffer layer.

Optionally, the first buffer layer and the second buffer layer are made from different materials.

Optionally, the material for forming the first buffer layer comprises silicon nitride, and the material for forming the second buffer layer comprises silicon dioxide.

Optionally, prior to forming the first buffer layer on the side, away from the base substrate, of the first planarization layer, the method further comprises:

forming a second planarization layer on the side, away from the base substrate, of the first planarization layer, wherein the second planarization layer and the first planarization layer are made from different materials.

Optionally, after forming the second planarization layer on the side, away from the base substrate, of the first planarization layer, the method further comprises:

performing ashing on a side, away from the base substrate, of the second planarization layer.

Optionally, forming the second planarization layer on the side, away from the base substrate, of the first planarization layer comprises:

coating the side, away from the base substrate, of the first planarization layer with a planarization material; and curing the planarization material to form the second planarization layer.

Optionally, the material for forming the first planarization layer comprises a resin material, and the planarization material for forming the second planarization layer comprises a fluorine-containing resin material.

Optionally, forming the WGP on the side, away from the base substrate, of the second buffer layer comprises:

forming a conductive thin film on the side, away from the base substrate, of the second buffer layer;

forming a hard mask on a side, away from the base substrate, of the conductive thin film;

coating a side, away from the base substrate, of the hard mask with an imprint resist;

imprinting the imprint resist with a nano imprint template to form an imprint pattern; and etching the hard mask and the conductive thin film based on the imprint pattern, and stripping the residual hard mask to form the WGP.

Optionally, after forming the WGP on the side, away from the base substrate, of the second buffer layer, the method further comprises:

forming a protective layer on a side, away from the base substrate, of the WGP.

Optionally, the patterned film layer is a color film layer.

Optionally, the patterned film layer is a color film layer, the first planarization layer is made from a resin material, the first buffer layer is made from silicon nitride, and the second buffer layer is made from silicon dioxide;

before forming the first buffer layer on the side, away from the base substrate, of the first planarization layer, the method further comprises:

coating the side, away from the base substrate, of the first planarization layer with a planarization material which is a fluorine-containing resin material;

photocuring the planarization material to form the second planarization layer;

performing ashing on the side, away from the base substrate, of the second planarization layer; and after forming the WGP on the side, away from the base substrate, of the second buffer layer, the method further comprises: forming a protective layer on the side, away from the base substrate, of the WGP.

In another aspect, there is provided a display substrate, comprising:

a patterned film layer on a base substrate and a first planarization layer on a side, away from the base substrate, of the patterned film layer;

a first buffer layer on a side, away from the base substrate, of the first planarization layer;

a second buffer layer on a side, away from the base substrate, of the first buffer layer; and a WGP on a side, away from the base substrate, of the second buffer layer.

Optionally, the first buffer layer and the second buffer layer are made from different materials.

Optionally, the material for forming the first buffer layer comprises silicon nitride, and the material for forming the second buffer layer comprises silicon dioxide.

Optionally, the display substrate further comprises:

a second planarization layer between the first planarization layer and the first buffer layer, wherein the second planarization layer and the first planarization layer are made from different materials.

Optionally, the material for forming the first planarization layer comprises a resin material, and the planarization material for forming the second planarization layer comprises a fluorine-containing resin material.

Optionally, the display substrate further comprises:

a protective layer on a side, away from the base substrate, of the WGP.

Optionally, the patterned film layer is a color film layer.

Optionally, the patterned film layer is a color film layer, the material for forming the first buffer layer comprises silicon nitride, and the material for forming the second buffer layer comprises silicon dioxide; and the display substrate further comprises: a protective layer on a side, away from the base substrate, of the WGP.

In yet another aspect, there is provided a display device, comprising the display substrate described in the above aspect.

BRIEF DESCRIPTION OF THE DRAWINGS

In order to describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

Embodiments of the present disclosure will be described in further detail with reference to the accompanying drawings, to present the objects, technical solutions, and advantages of the present disclosure more clearly.

In the related art, during formation of a WGP, the material of a buffer layer chemically reacts with the material of a planarization layer, which damages the surface of the planarization layer and affects the planarization of the planarization layer.

Figure 1:
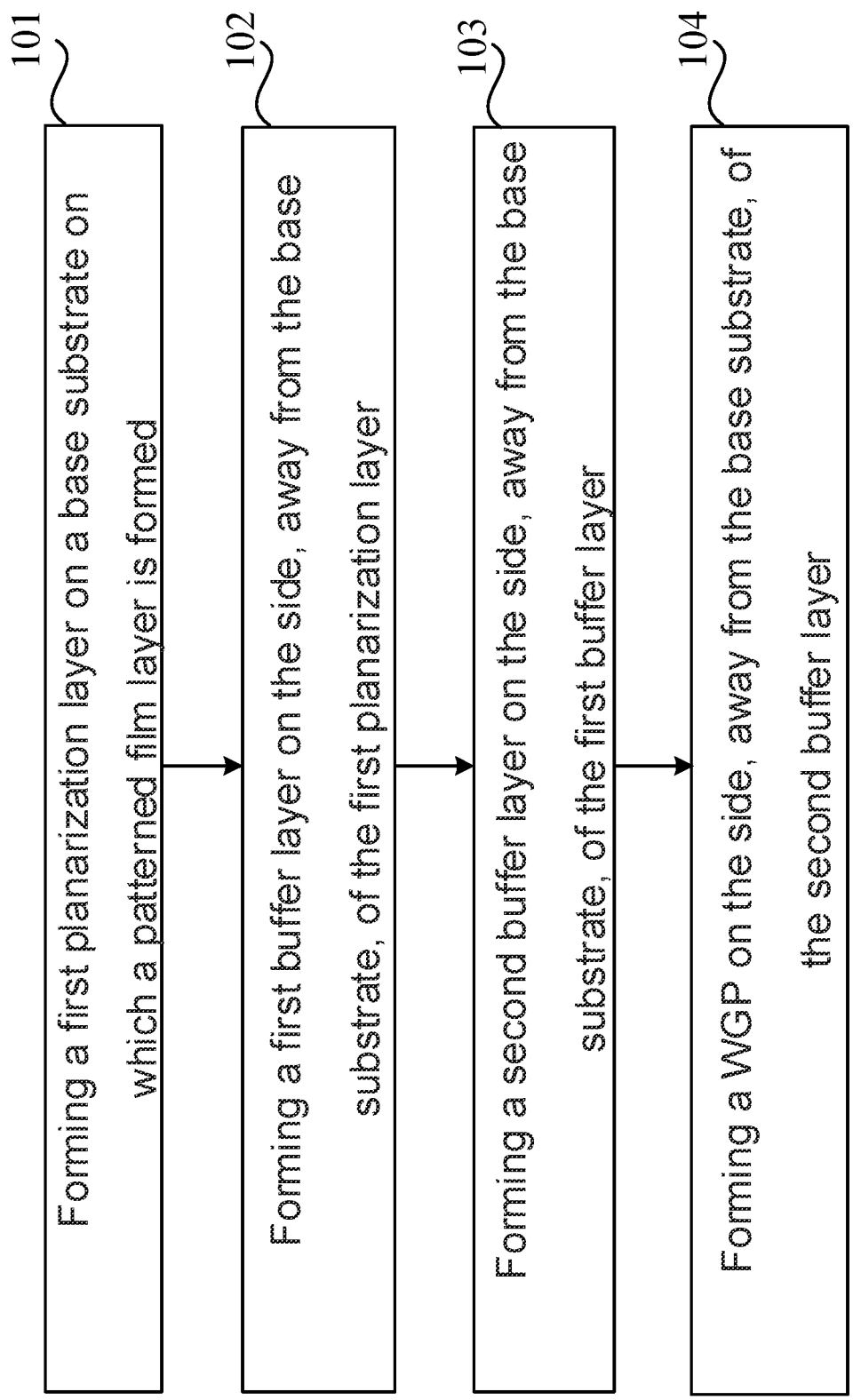
FIG. 1 is a flow chart of a manufacturing method of a display substrate according to an embodiment of the present disclosure.

An embodiment of the present disclosure provides a manufacturing method of a display substrate. As shown in FIG. 1, the method may include the following steps.

In step 101, a first planarization layer is formed on a base substrate on which a patterned film layer is formed.

Figure 2:
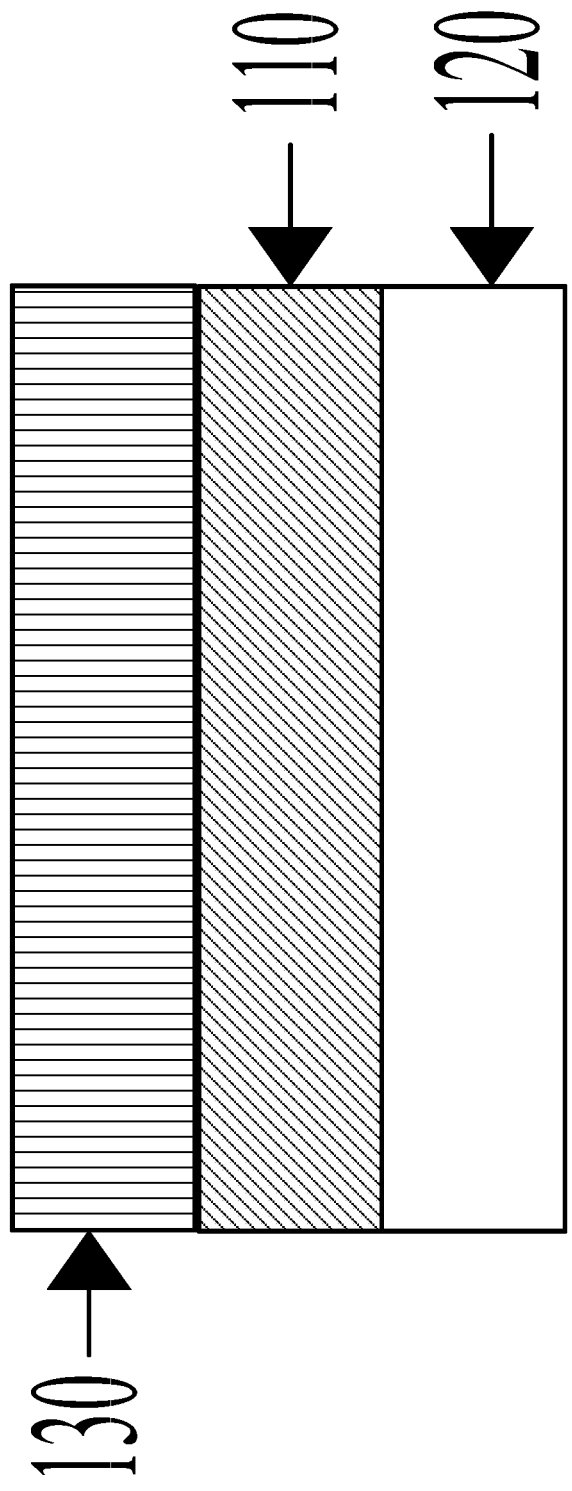
FIG. 2 is a schematic structural diagram of a base substrate on which a first planarization layer is formed according to an embodiment of the present disclosure.

In the embodiment of the present disclosure, a patterned film layer may be formed on the base substrate first. Then, the first planarization layer 130 may be formed on the base substrate 120 on which the patterned film layer 110 is formed. Referring to FIG. 2 for a schematic diagram of the base substrate 120 on which the first planarization layer 130 is formed. Exemplarily, the thickness of the first planarization layer 130 may be 2 μm and the first planarization layer 130 may be made from a resin material.

When the display substrate is a color film substrate, the patterned film layer 110 may be a color film layer. When the display substrate is an array substrate, the patterned film layer 110 may be a film layer including a TFT (Thin Film Transistor) therein. For example, the patterned film layer 110 may include a gate layer, a gate insulating layer, an active layer, a source/drain layer, etc. A gate of the TFT is formed in the gate layer. A source and a drain of the TFT are formed in the source/drain layer.

In step 102, a first buffer layer is formed on the side, away from the base substrate, of the first planarization layer.

Figure 3:
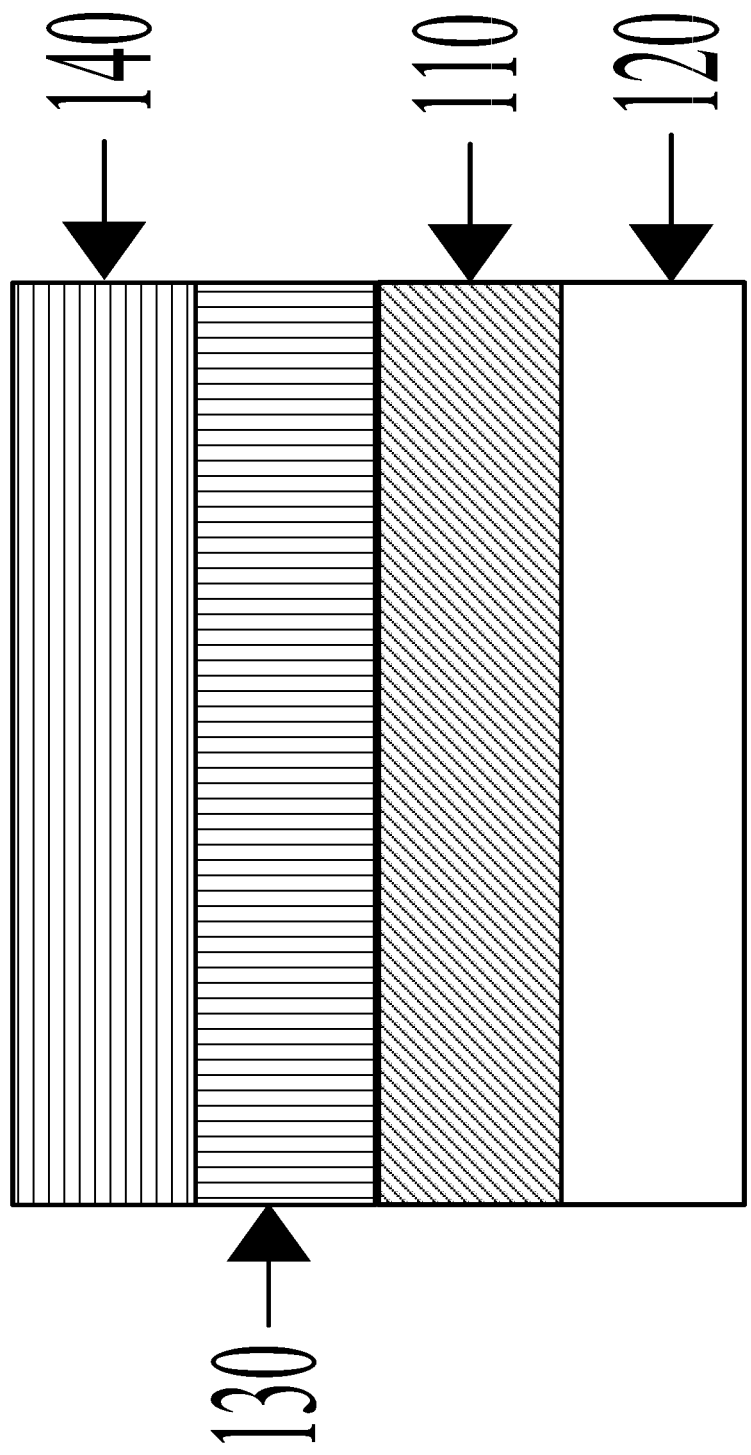
FIG. 3 is a schematic structural diagram of a base substrate on which a first buffer layer is formed according to an embodiment of the present disclosure.

The first buffer layer 140 may be formed on the side, away from the base substrate 120, of the first planarization layer 130. Referring to FIG. 3 for a schematic diagram of the base substrate 120 on which the first buffer layer 140 is formed.

In step 103, a second buffer layer is formed on the side, away from the base substrate, of the first buffer layer.

Figure 4:
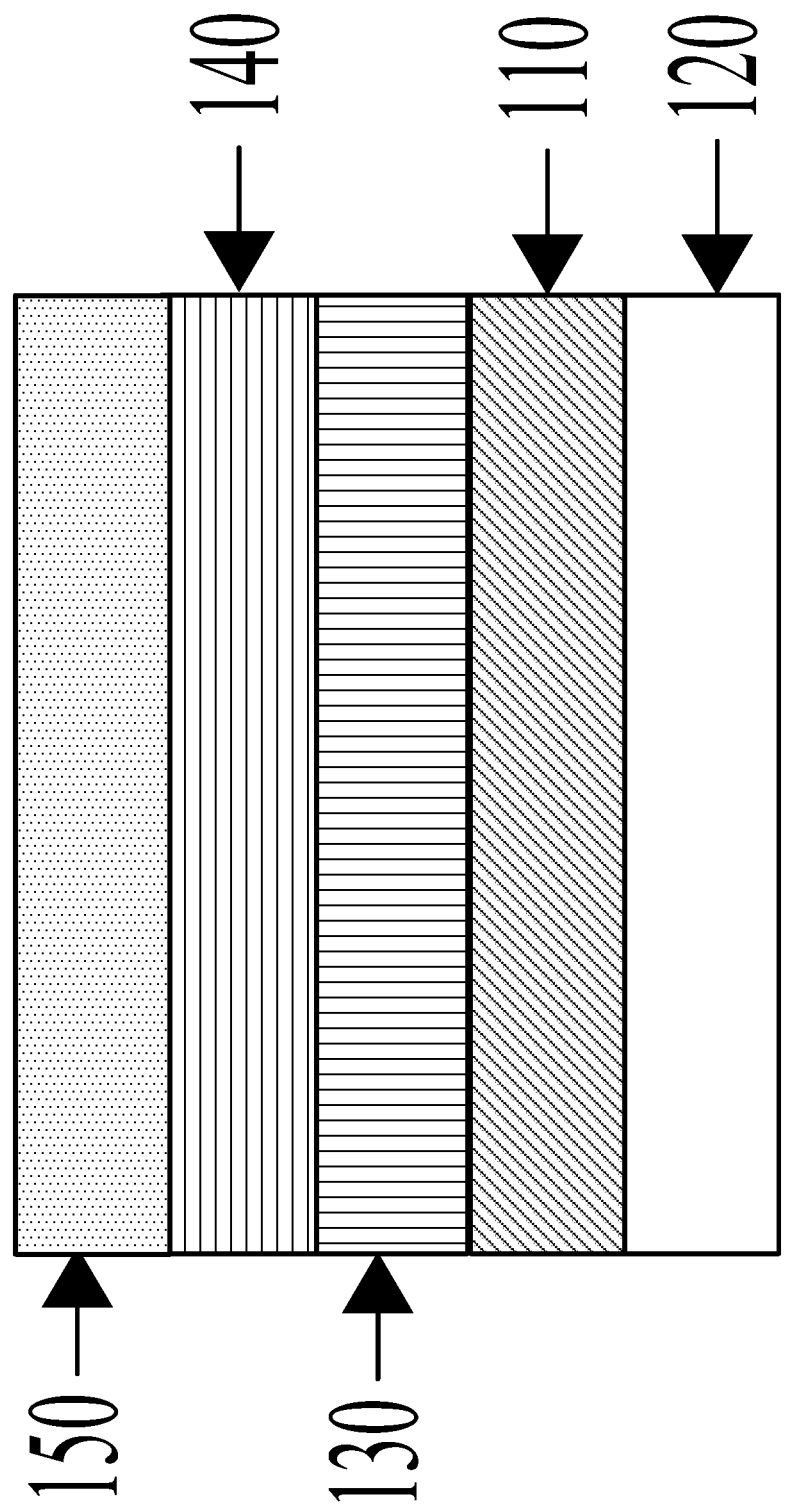
FIG. 4 is a schematic structural diagram of a base substrate on which a second buffer layer is formed according to an embodiment of the present disclosure.

The second buffer layer 150 may be formed on the side, away from the base substrate 120, of the first buffer layer 140. Referring to FIG. 4 for a schematic diagram of the base substrate 120 on which the second buffer layer 150 is formed. Here, the material for forming the second buffer layer 150 may be the same as or different from the material for forming the first buffer layer 140.

For example, both of the two buffer layers may be made from a silicon dioxide material. Alternatively, the first buffer layer 140 may be made from a silicon nitride material and the second buffer layer 150 may be made from a silicon dioxide material.

In step 104, a WGP is formed on the side, away from the base substrate, of the second buffer layer.

Figure 5:
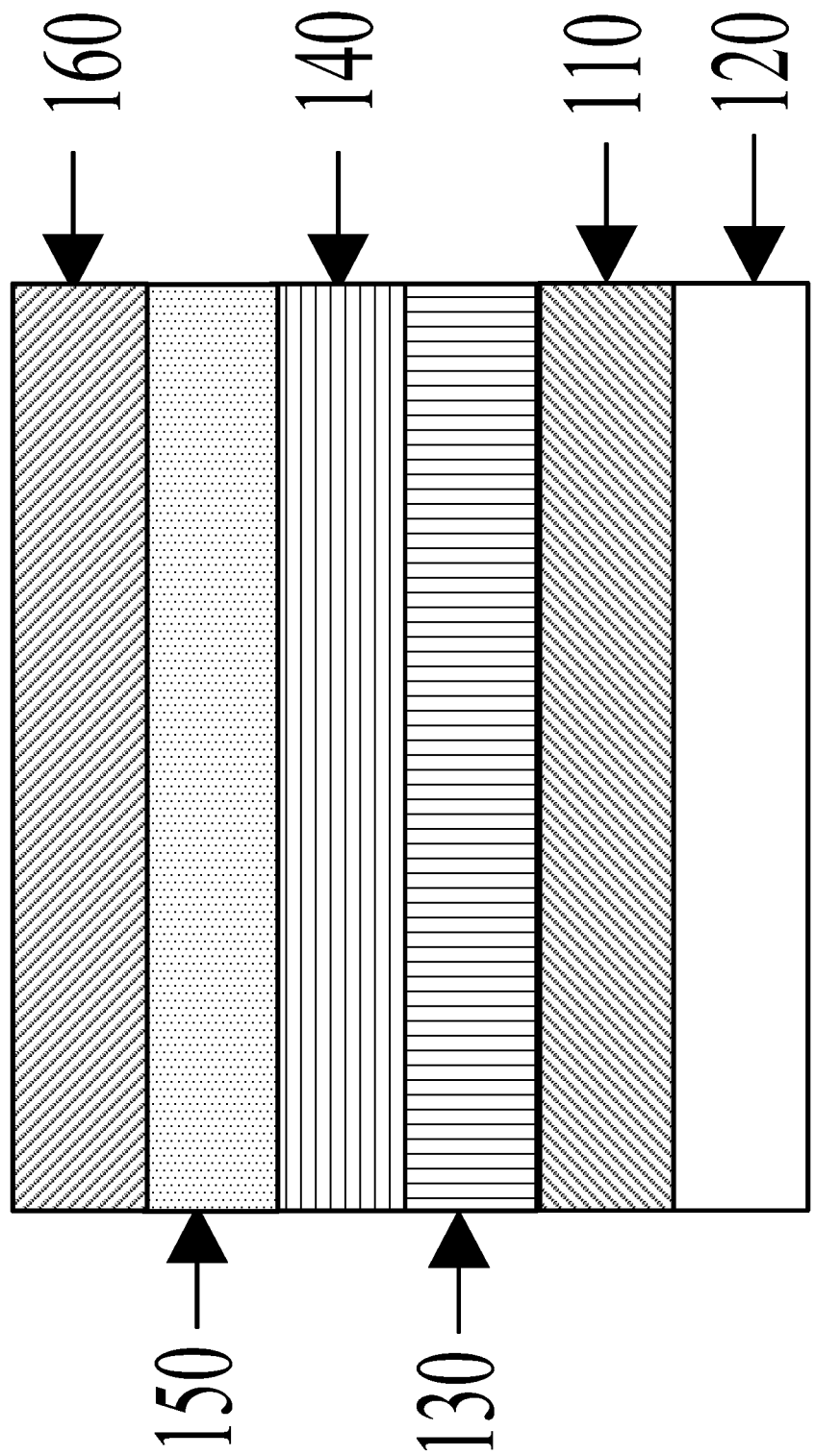
FIG. 5 is a schematic structural diagram of a base substrate on which a WGP is formed according to an embodiment of the present disclosure.

In the embodiment of the present disclosure, the WGP 160 is formed on the side, away from the base substrate 120, of the second buffer layer 150 by a nano imprinting process. Referring to FIG. 5 for a schematic diagram of the base substrate 120 on which the WGP 160 is formed.

In summary, according to the manufacturing method of the display substrate, provided in the embodiment of the present disclosure, a first planarization layer may be formed on the base substrate on which a patterned film layer is formed. A first buffer layer is formed on the side, away from the base substrate, of the first planarization layer. Then, a second buffer layer is formed on the side, away from the base substrate, of the first buffer layer. At last, a WGP is formed on the side, away from the base substrate, of the second buffer layer. By forming two buffer layers on the base substrate, the thickness of the buffer layer increases. Thus, during formation of the WGP, the surface of the first planarization layer will not be damaged. In comparison with the related art, the planarization of the planarization layer is improved.

Figure 6:
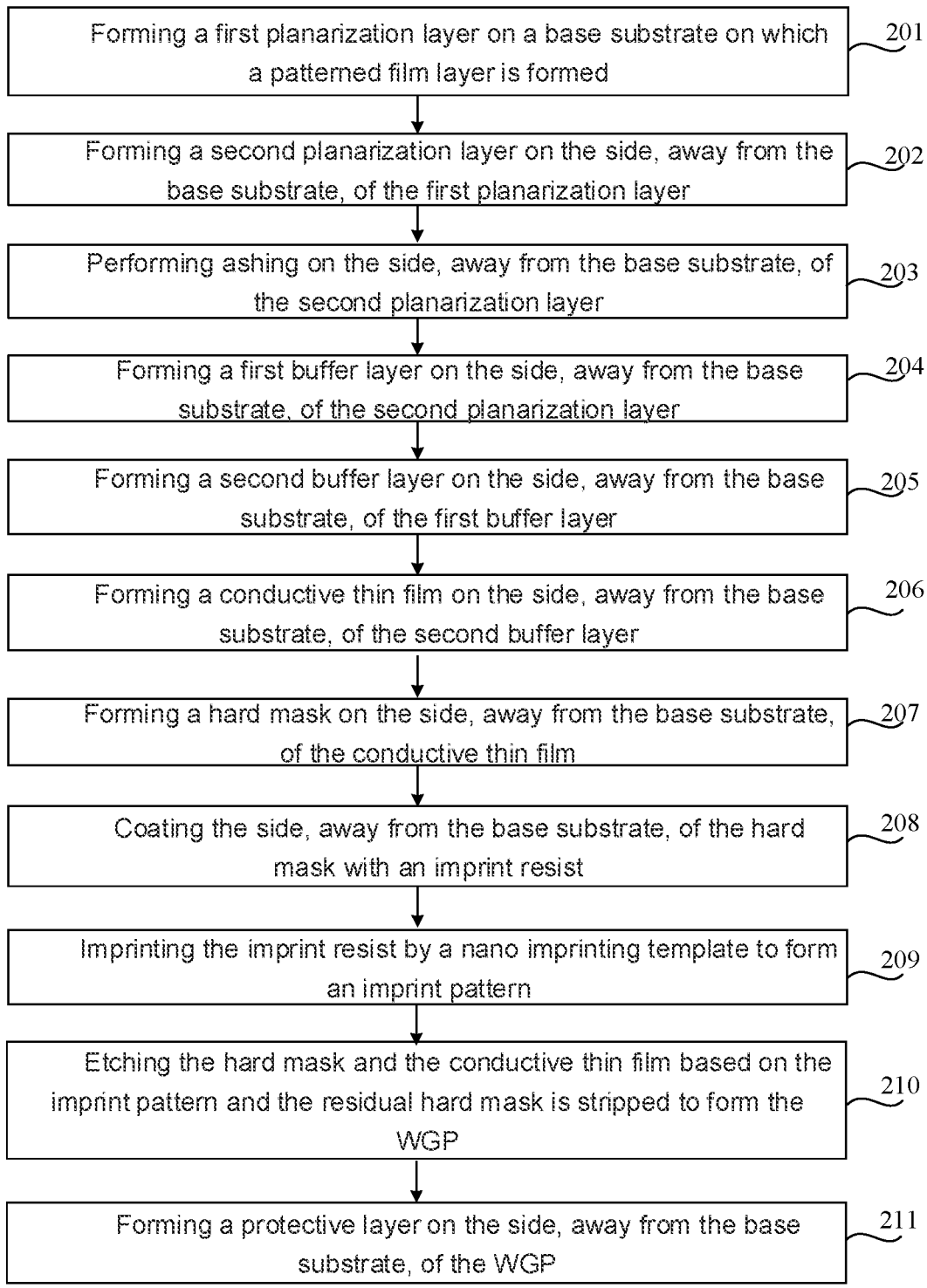
FIG. 6 is a flow chart of another manufacturing method of a display substrate according to an embodiment of the present disclosure.

An embodiment of the present disclosure provides another manufacturing method of a display substrate. As shown in FIG. 6, the method may include the following steps.

In step 201, a first planarization layer is formed on a base substrate on which a patterned film layer is formed.

In the embodiment of the present disclosure, when the display substrate is a color film substrate, the patterned film layer 110 may be a color film layer. When the display substrate is an array substrate, the patterned film layer 110 may be a film layer including a TFT therein.

Figure 7:
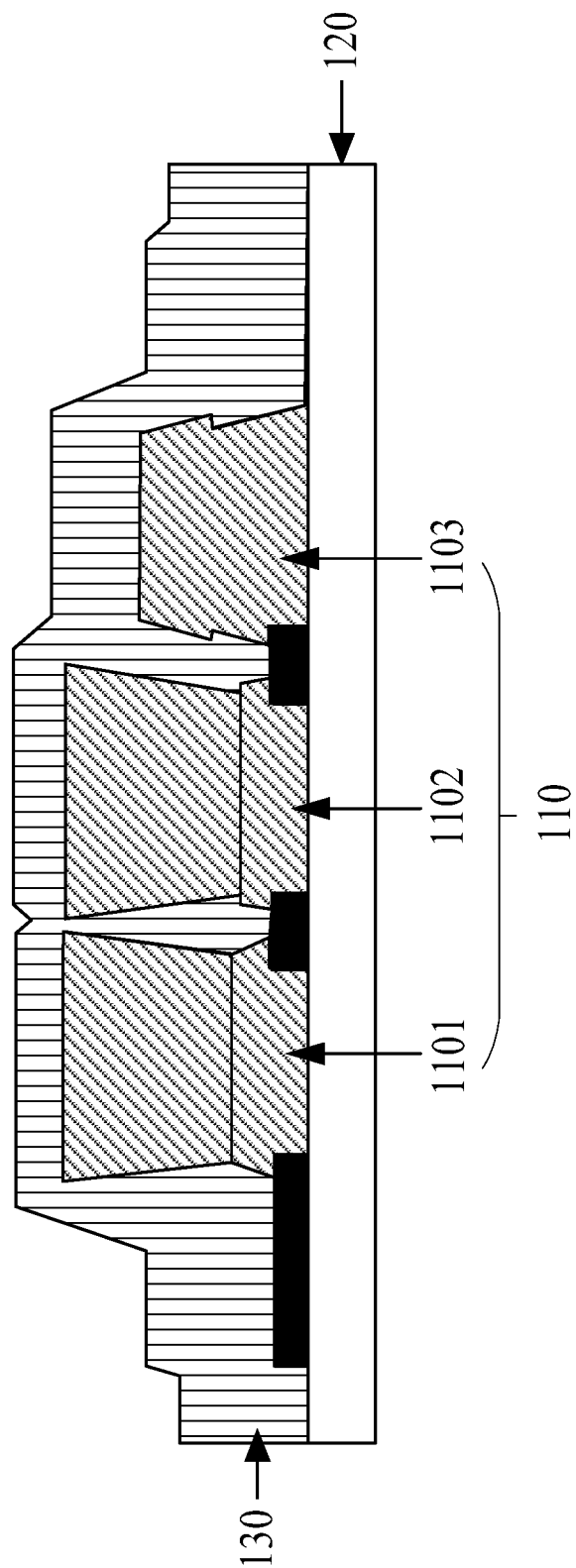
FIG. 7 is a schematic structural diagram of another base substrate on which a first planarization layer is formed according to an embodiment of the present disclosure.

Exemplarily, by taking the color film substrate as an example, as shown in FIG. 7, the color film layer 110 which includes a red color film 1101, a green color film 1102 and a blue color film 1103 may be formed on the base substrate by a photoetching process. Here, the photoetching process may include photoresist coating, exposure, developing, etching and stripping of the photoresist. The color film layer 110 may have a thickness of 2.1 μm.

Optionally, during formation of the first planarization layer, the side, away from the base substrate 120, of the patterned film layer 110 may be coated with a resin material. Then, thermocuring is performed on the resin material to form the first planarization layer 130. Referring to FIG. 7 for a schematic diagram of the base substrate 120 on which the first planarization layer 130 is formed. The first planarization layer may have a thickness of 2 μm.

In step 202, a second planarization layer is formed on the side, away from the base substrate, of the first planarization layer.

Figure 8:
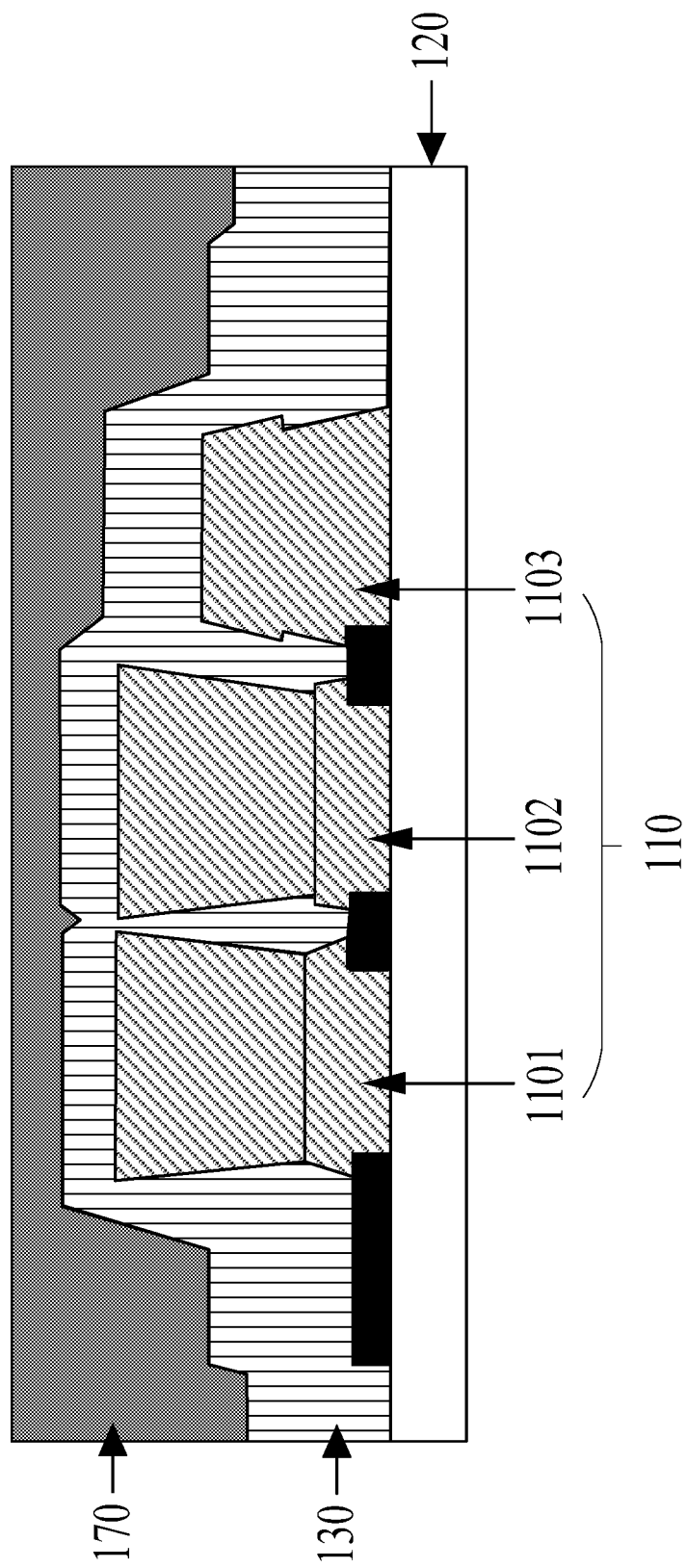
FIG. 8 is a schematic structural diagram of a base substrate on which a second planarization layer is formed according to an embodiment of the present disclosure.

Referring to FIG. 8 for a schematic diagram of the base substrate 120 on which the second planarization layer 170 is formed. The second planarization layer 170 and the first planarization layer 130 may be made from different materials. For example, the material for forming the first planarization layer 130 may include a resin material, and the planarization material for forming the second planarization layer 170 may include a fluorine-containing resin material, to ensure that the second planarization layer and the first planarization layer have relatively strong adhesion. Thus, the planarization effect of the planarization layers (namely, the first planarization layer 130 and the second planarization layer 170) is improved, which ensures that a WGP can be normally formed later. However, in the related art, after a planarization layer is formed on a base substrate on which a patterned film layer is formed, as planarization effect of the planarization layer is relatively poor, a WGP is difficult to be formed later.

Optionally, during formation of the second planarization layer 170, the side, away from the base substrate 120, of the first planarization layer 130 may be coated with a planarization material first. The planarization material may be a fluorine-containing resin material. After that, photocuring may be performed on the planarization material to form the second planarization layer 170.

Exemplarily, photocuring may be performed on the planarization material by ultraviolet light to form the second planarization layer 170. In the embodiment of the present disclosure, by performing photocuring on the planarization material, the strength of the second planarization layer may be improved, which facilitates follow-up formation of the WGP by a nano imprinting process.

In step 203, asking is performed on the side, away from the base substrate, of the second planarization layer.

Optionally, the side, away from the base substrate 120, of the second planarization layer 170 may be bombarded with oxygen plasma gas to change the structure on the surface of the second planarization layer 170.

In step 204, a first buffer layer is formed on the side, away from the base substrate, of the second planarization layer.

Figure 9:
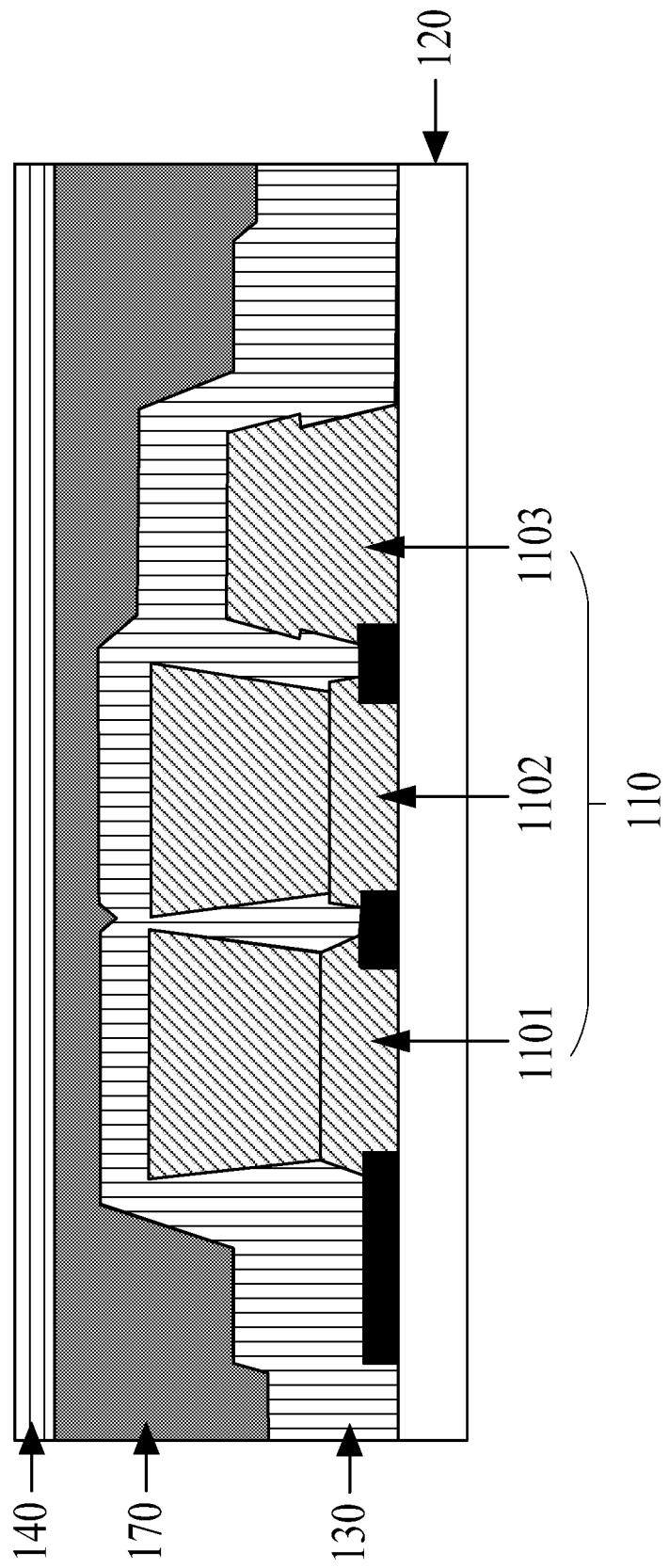
FIG. 9 is a schematic structural diagram of another base substrate on which a first buffer layer is formed according to an embodiment of the present disclosure.

In the embodiment of the present disclosure, a first buffer layer 140 may be formed on the side, away from the base substrate 120, of the second planarization layer 170. Referring to FIG. 9 for a schematic diagram of the base substrate 120 on which the first buffer layer 140 is formed.

Exemplarily, silicon nitride may be deposited on the side, away from the base substrate 120, of the second planarization layer 170 to form the first buffer layer 140. Here, silicon nitride may have a thickness of 1,000 Å (angstrom).

In the related art, a buffer layer is generally made from silicon dioxide, and the planarization layer is generally made from a resin material which contains carbon atoms. During follow-up formation of a WGP, since oxygen ions in the material of the buffer layer chemically reacts with the carbon atoms in the material of the planarization layer, the surface of the planarization layer is damaged, which affects the planarization of the planarization layer. In addition, since the adhesion between the buffer layer and the planarization layer is weak, during removal of a nano imprinting template, the buffer layer and the planarization layer may separate from each other easily.

In the embodiment of the present disclosure, since the first buffer layer 140 is made from silicon nitride, during follow-up formation of the WGP 160, the material of the first buffer layer 140 does not chemically react with the material of the second planarization layer 170. Thus, the surface of the second planarization layer 170 will not be damaged. In comparison with the related art, the planarization of the planarization layers is improved.

Moreover, by performing asking on the second planarization layer 170, a contact angle between the second planarization layer 170 and the first buffer layer 140 is reduced. The contact angle refers to an angle between a liquid and the second planarization layer 170 after the liquid is dropped on the surface of the second planarization layer

170. Thus, the adhesion between the second planarization layer 170 and the first buffer layer 140 is enhanced, and the first buffer 140 and the second planarization layer 170 are prevented from separation during follow-up removal of the nano imprinting template.

In step 205, a second buffer layer is formed on the side, away from the base substrate, of the first buffer layer.

Figure 10:
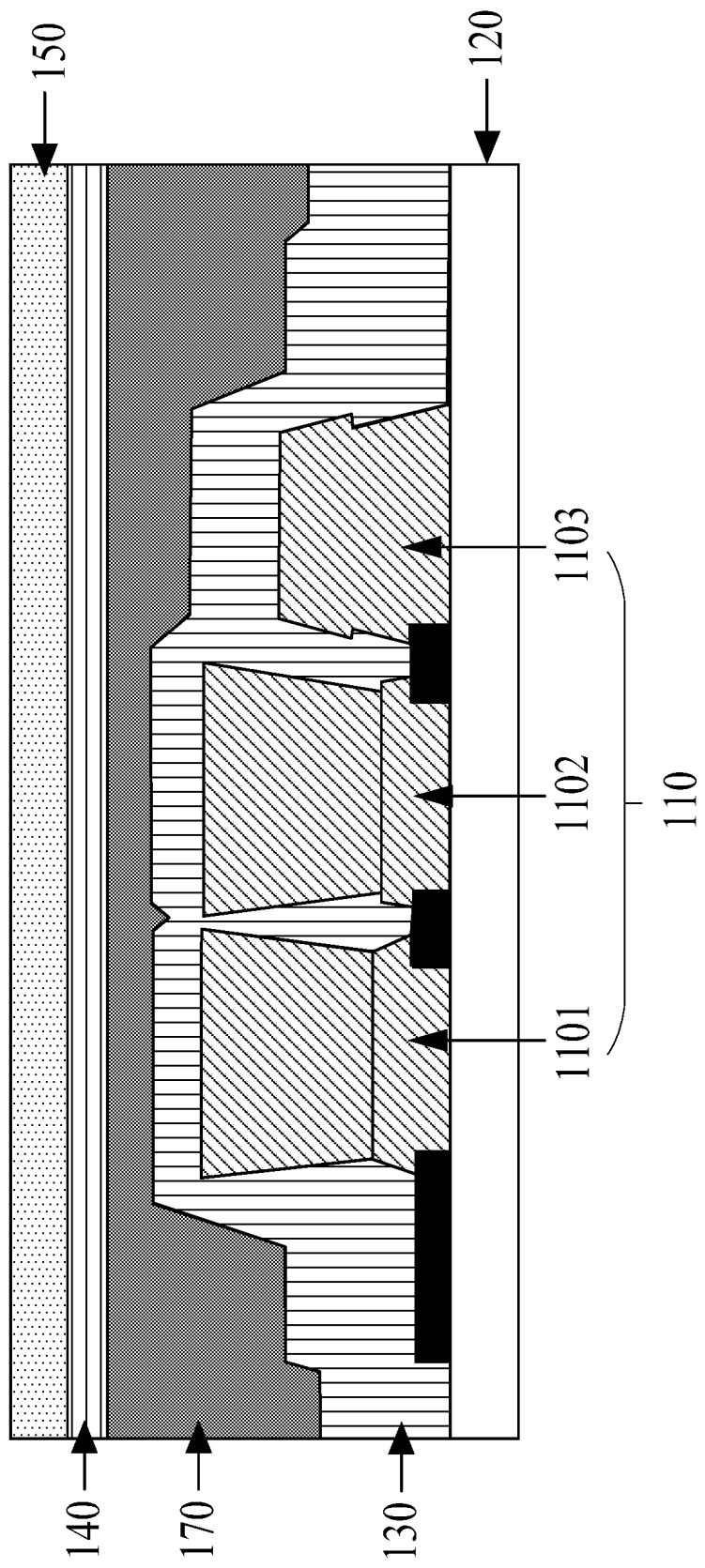
FIG. 10 is a schematic structural diagram of another base substrate on which a second buffer layer is formed according to an embodiment of the present disclosure.

The second buffer layer 150 may be formed on the side, away from the base substrate 120, of the first buffer layer 140. Referring to FIG. 10 for a schematic diagram of the base substrate 120 on which the second buffer layer 150 is formed.

Silicon dioxide may be deposited on the side, away from the base substrate 120, of the first buffer layer 140 to form the second buffer layer 150. Here, silicon dioxide may have a thickness of 800 Å.

Since the refraction index of the material of the upper film and lower film of the WGP 160 has a great impact on the transmittance of the WGP 160, when the refraction index of the material of the upper film and lower film is 1.5, relatively excellent transmittance of the WGP 160 can be guaranteed. In the embodiment of the present disclosure, silicon dioxide is deposited on the side, away from the base substrate 120, of the first buffer layer 140, to serve as the second buffer layer 150, which can guarantee that the WGP 160 has a relatively excellent transmittance and polarizing characteristic.

In step 206, a conductive thin film is formed on the side, away from the base substrate, of the second buffer layer.

Figure 11:
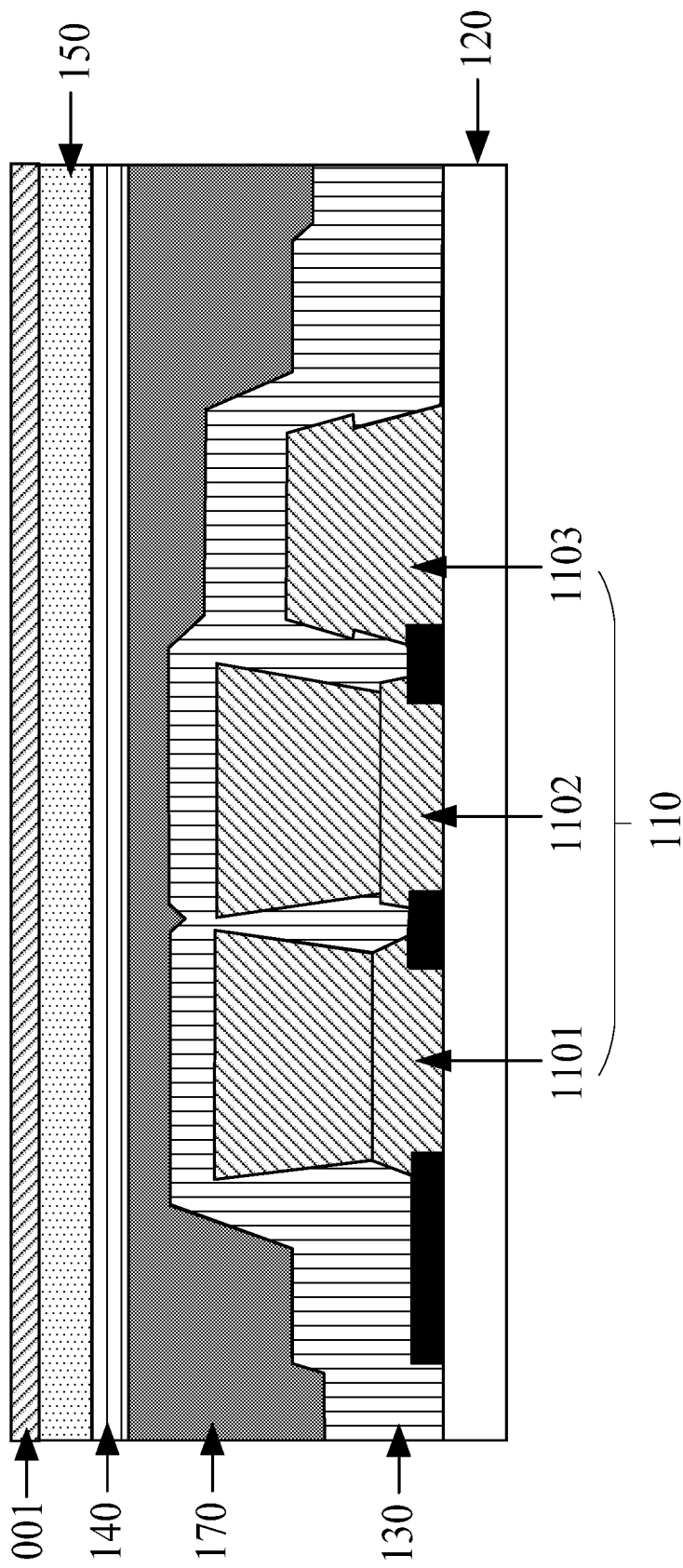
FIG. 11 is a schematic structural diagram of a base substrate on which a conductive thin film is formed according to an embodiment of the present disclosure.

The conductive thin film 001 may be formed on the side, away from the base substrate 120, of the second buffer layer 150. The conductive thin film 001 may be made of aluminum. Referring to FIG. 11 for a schematic diagram of the base substrate 120 on which the conductive thin film 001 is formed.

In step 207, a hard mask is formed on the side, away from the base substrate, of the conductive thin film.

Figure 12:
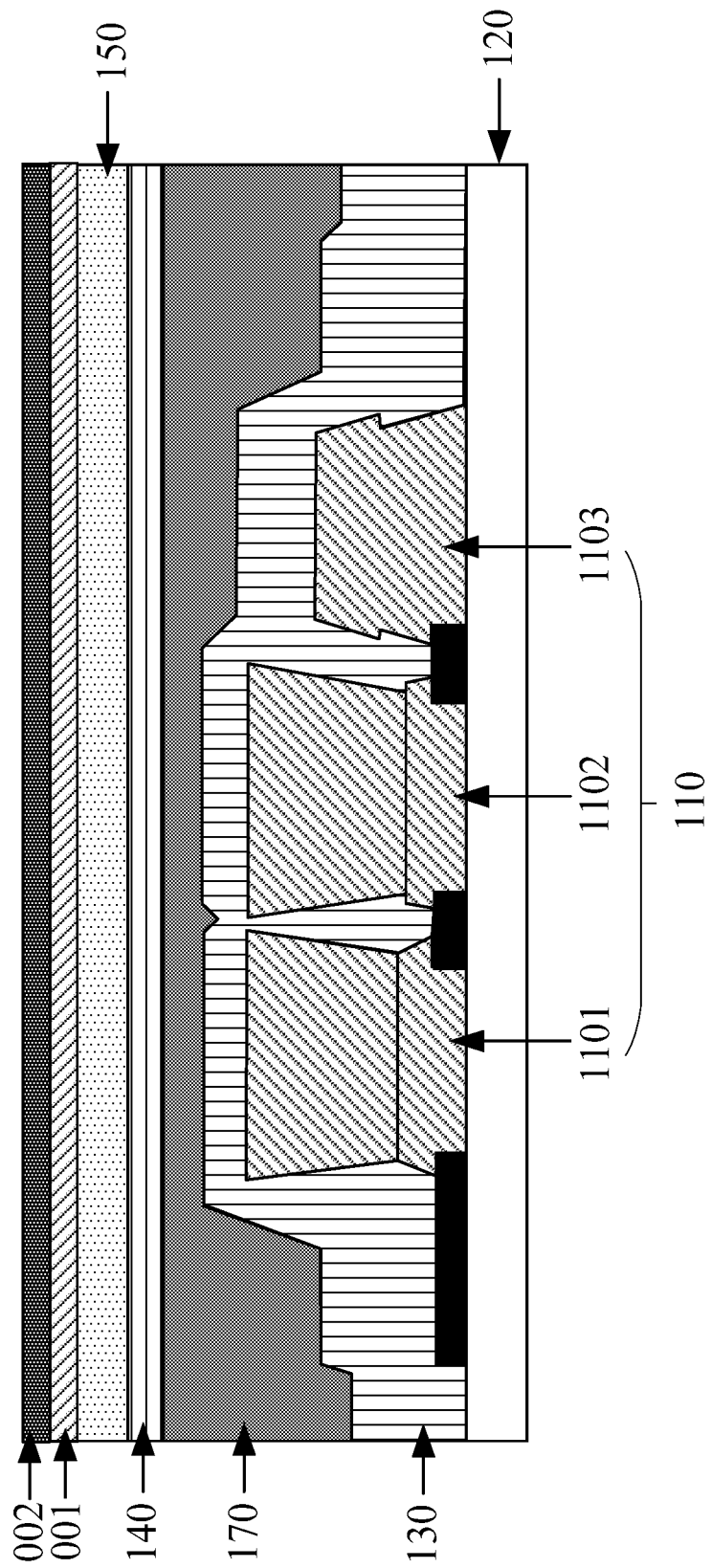
FIG. 12 is a schematic structural diagram of a base substrate on which a hard mask is formed according to an embodiment of the present disclosure.

The hard mask 002 may be formed on the side, away from the base substrate 120, of the conductive thin film 001. Referring to FIG. 12 for a schematic diagram of the base substrate 120 on which the hard mask 002 is formed.

Exemplarily, a layer of silicon dioxide is deposited on the side, away from the base substrate 120, of the conductive thin film 001, to serve as the hard mask 002.

In step 208, the side, away from the base substrate, of the hard mask is coated with an imprint resist.

Figure 13:
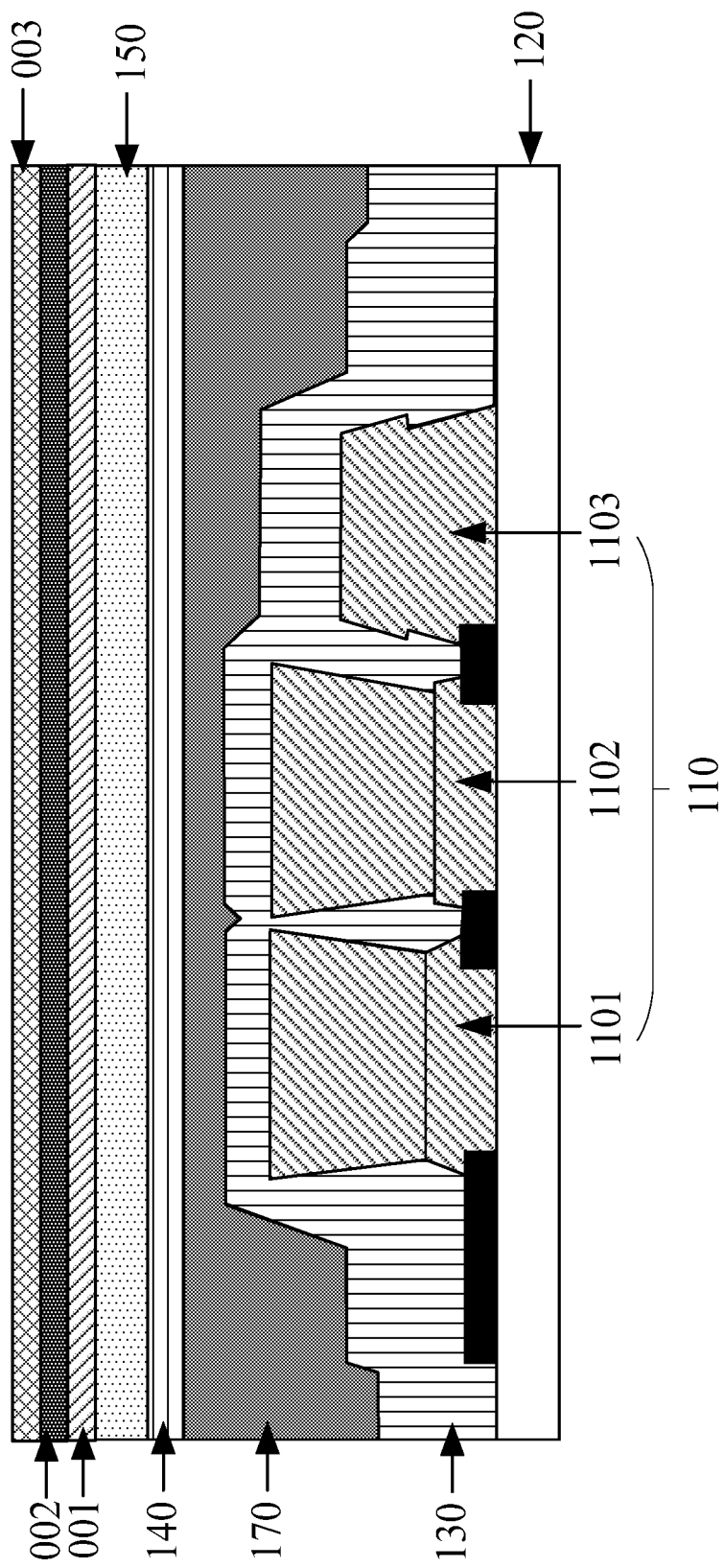
FIG. 13 is a schematic structural diagram of a base substrate coated with an imprint resist according to an embodiment of the present disclosure.

Optionally, the side, away from the base substrate 120, of the hard mask 002 may be coated with the imprint resist 003 by means of spin-coating. The imprint resist 003 may be a high polymer. Referring to FIG. 13 for a schematic diagram of the base substrate 120 coated with the imprint resist 003.

In step 209, the imprint resist is imprinted by a nano imprintin template to form an imprint pattern.

Figure 14:
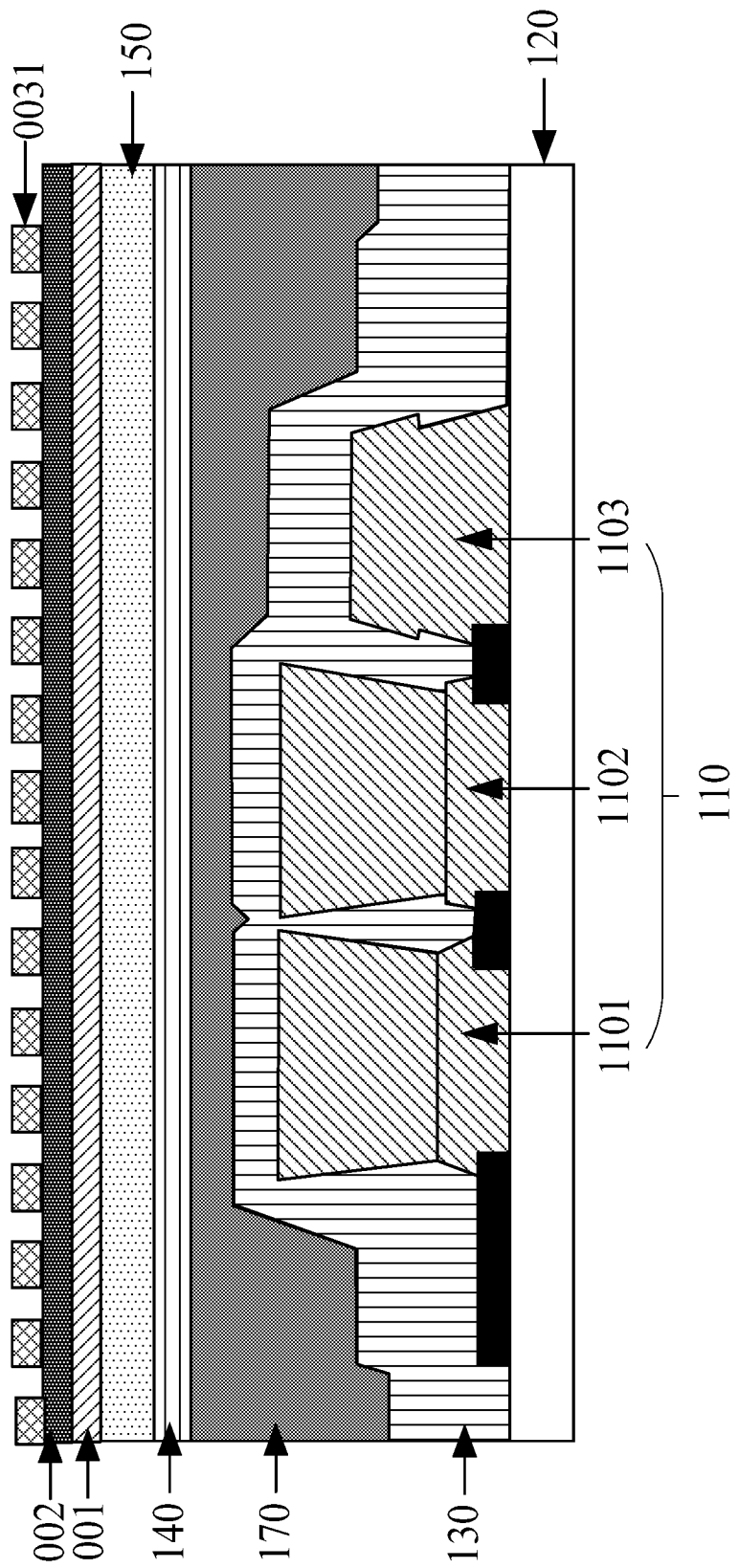
FIG. 14 is a schematic structural diagram of a base substrate on which an imprint pattern is formed according to an embodiment of the present disclosure.

The imprint resist 003 may be imprinted for multiple times by a nano imprinting template, to form the imprint pattern 0031. Referring to FIG. 14 for a schematic diagram of the base substrate 120 on which the imprint pattern 0031 is formed.

In step 210, the hard mask and the conductive thin film are etched based on the imprint pattern and the residual hard mask is stripped to form the WGP.

Figure 15:
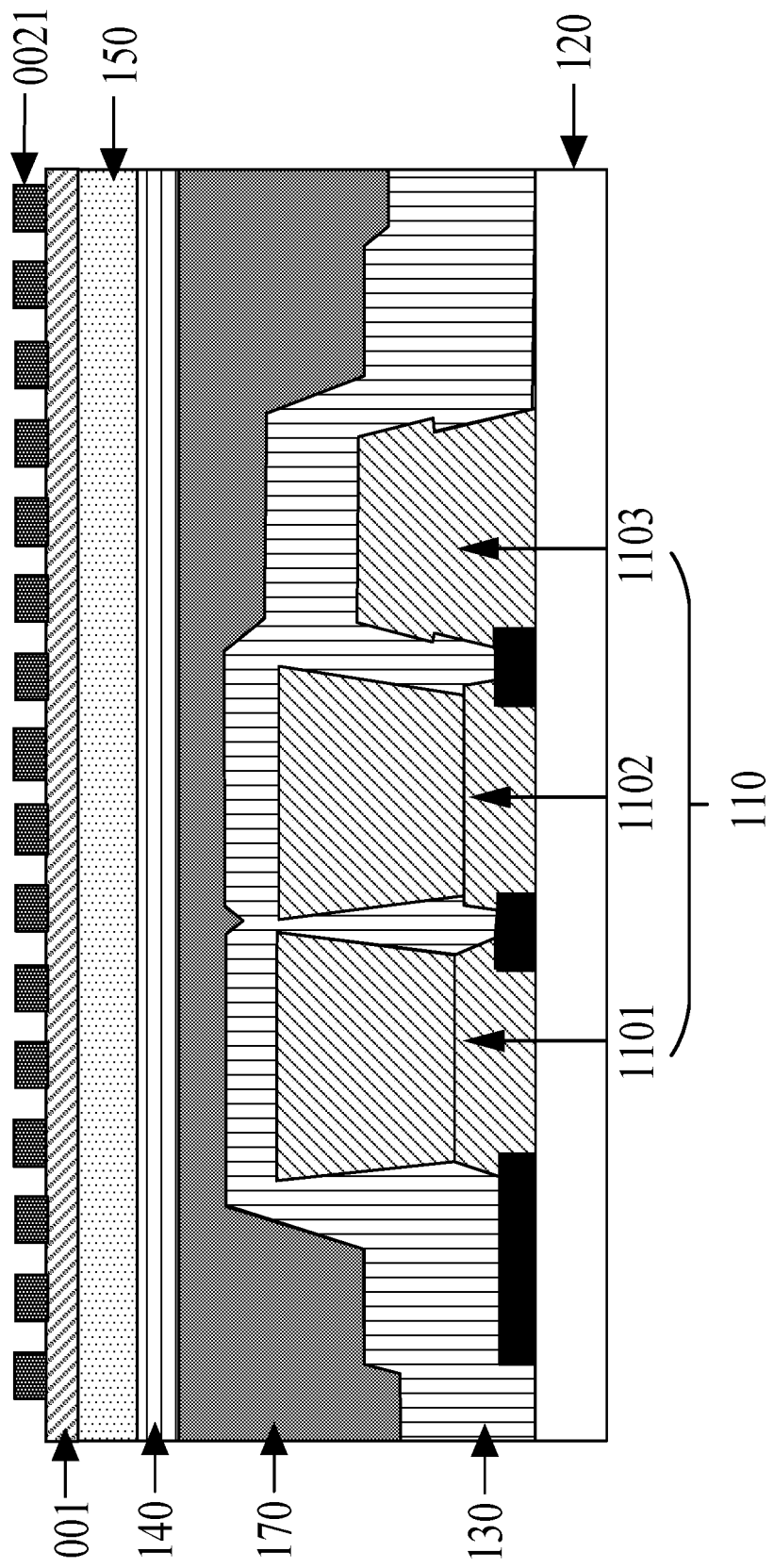
FIG. 15 is a schematic structural diagram of a base substrate on which a hard mask pattern is formed according to an embodiment of the present disclosure.
Figure 16:
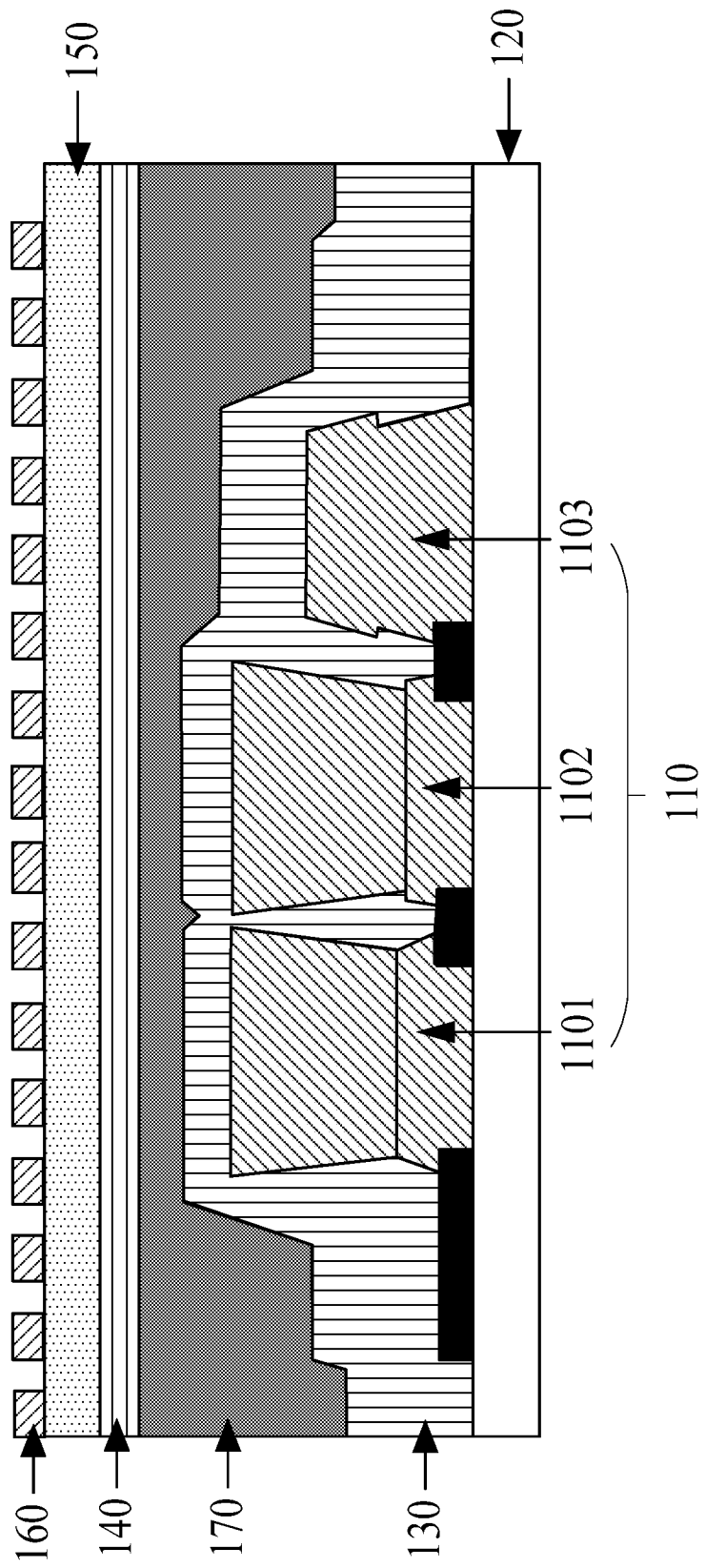
FIG. 16 is a schematic structural diagram of a base substrate on which a WGP is formed according to an embodiment of the present disclosure.

In the embodiment of the present disclosure, the hard mask 002 may be etched first based on the imprint pattern 0031, and the residual imprint resist 003 is stripped. That is, the imprint pattern 0031 is stripped to obtain a hard mask pattern 0021 shown in FIG. 15. Then, the conductive thin film 001 may be etched based on the hard mask pattern 0021, and the residual hard mask 002 is stripped. That is, the hard mask pattern 0021 is stripped to form the WGP 160. Referring to FIG. 16 for a schematic diagram of the base substrate 120 on which the WGP 160 is formed.

In step 211, a protective layer is formed on the side, away from the base substrate, of the WGP.

Figure 17:
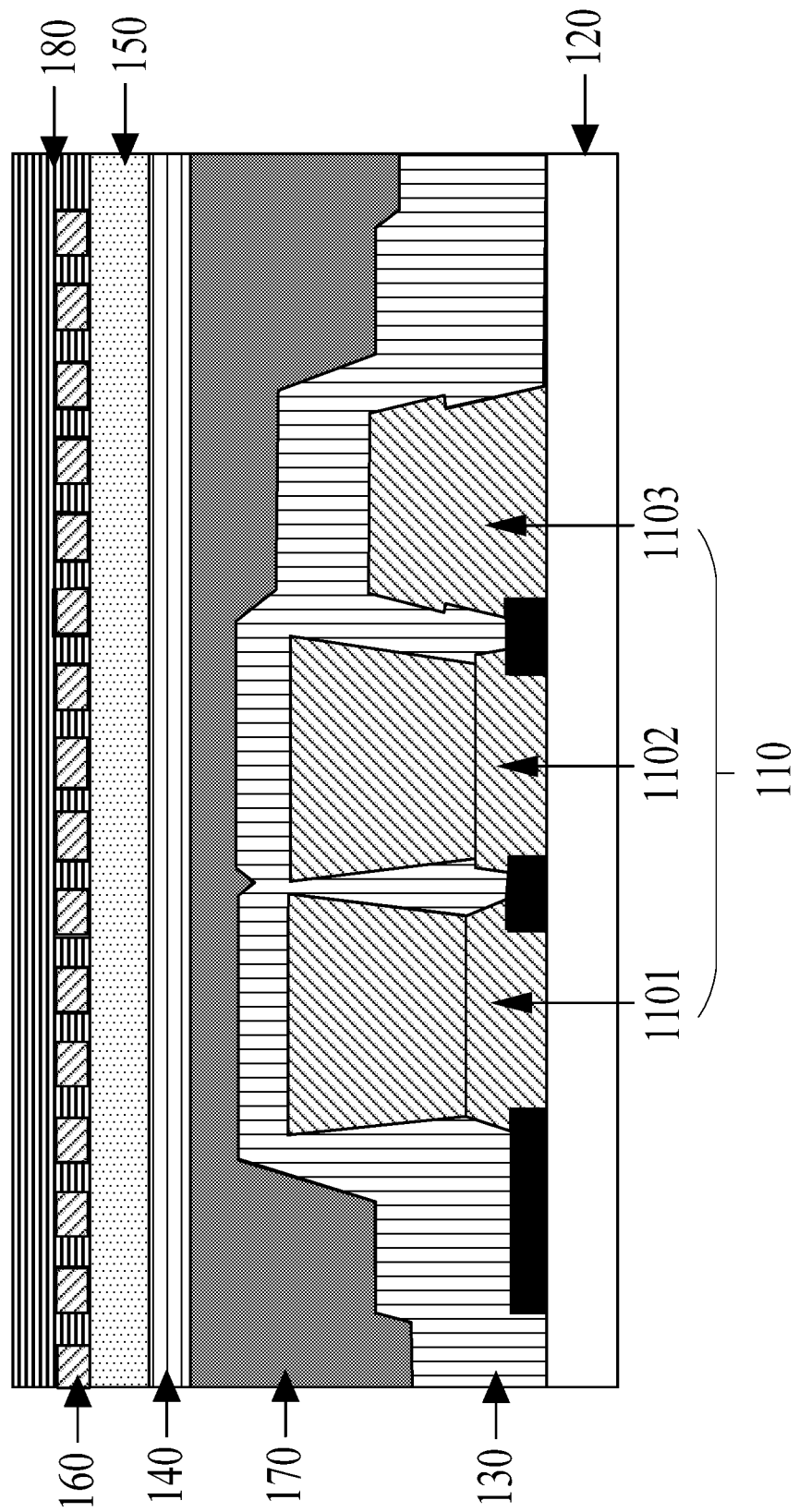
FIG. 17 is a schematic structural diagram of a base substrate on which a protective layer is formed according to an embodiment of the present disclosure.

In the embodiment of the present disclosure, silicon dioxide may be deposited on the side, away from the base substrate 120, of the WGP 160, and silicon nitride may be deposited on the side, away from the base substrate 120, of the deposited silicon dioxide to form the protective layer 180. Referring to FIG. 17 for a schematic diagram of the base substrate 120 on which the protective layer 180 is formed.

In summary, according to the manufacturing method of the display substrate provided in the embodiment of the present disclosure, a first planarization layer is formed on the base substrate on which a patterned film layer is formed. A second planarization layer is formed on the side, away from the base substrate, of the first planarization layer, and ashing is performed on the second planarization layer. A first buffer layer is formed on the side, away from the base substrate, of the second planarization layer. A second buffer layer is formed on the side, away from the base substrate, of the first buffer layer. A WGP is formed on the side, away from the base substrate, of the second buffer layer. By adding the second planarization layer and the first buffer layer, the planarization of the planarization layers is improved. In addition, by performing ashing on the second planarization layer, the adhesion between the second planarization layer and the first buffer layer increases, and the first buffer layer and the second planarization layer are prevented from separation during follow-up removal of the nano imprinting template.

An embodiment of the present disclosure provides a display substrate which may be manufactured by the manufacturing methods provided in the above embodiments. As shown in FIG. 1, the display substrate may include: a patterned film layer 110 on a base substrate 120, a first planarization layer 130 on the side, away from the base substrate 120, of the planarization front film layer 110, a first buffer layer 140 on the side, away from the base substrate 120, of the first planarization layer 130, a second buffer layer 150 on the side, away from the base substrate 120, of the first buffer layer 140, and a WGP 160 on the side, away from the base substrate 120, of the second buffer layer 150.

The material for forming the first planarization layer 130 may include a resin material. The material for forming the first buffer layer 140 may include silicon nitride. The material for forming the second buffer layer 150 may include silicon dioxide.

In summary, a display substrate is provided in the embodiment of the present disclosure. The display substrate includes a patterned film layer on the base substrate, a first planarization layer on the side, away from the base substrate, of the patterned film layer, a first buffer layer on the side, away from the base substrate, of the first planarization layer, a second buffer layer on the side, away from the base substrate, of the first buffer layer and a WGP on the side, away from the base substrate, of the second buffer layer. By disposing two buffer layers on the base substrate, the thickness of the buffer layer increases. Thus, during formation of the WGP, the surface of the planarization layer will not be damaged. In comparison with the related art, the planarization of the planarization layer is improved.

Optionally, as shown in FIG. 17, the display substrate may further include: a second planarization layer 170 between the first planarization layer 130 and the first buffer layer 140 and a protective layer 180 on the side, away from the base substrate 120, of the WGP 160.

The patterned film layer 110 may be a color film layer. That is, the display substrate may be a color film substrate. The material for forming the first planarization layer 130 may include a resin material. The material for forming the second planarization layer 170 may include a fluorine-containing resin material. The first buffer layer 140 may be made from silicon nitride. The second buffer layer 150 may be made from silicon dioxide. The material for forming the protective layer 180 may include silicon dioxide and silicon nitride.

In summary, a display substrate is provided in the embodiment of the present disclosure. The display substrate includes a patterned film layer on the base substrate, a first planarization layer on the side, away from the base substrate, of the patterned film layer, a first buffer layer on the side, away from the base substrate, of the first planarization layer, a second buffer layer on the side, away from the base substrate, of the first buffer layer and a WGP located on the side, away from the base substrate, of the second buffer layer. By disposing two buffer layers on the base substrate, the thickness of the buffer layer increases. Thus, during formation of the WGP, the surface of the planarization layer will not be damaged. In comparison with the related art, the planarization of the planarization layer is improved.

An embodiment of the present disclosure provides a display device. The display device may include the display substrate provided in the above embodiments. For example, the display device may include the display substrate shown in FIG. 1 or FIG. 17. The display device may be any product or component with a display function, such as a liquid crystal panel, a piece of electronic paper, a mobile phone, a tablet PC, a television, a display, a laptop computer, a digital photo frame or a navigator.

The foregoing descriptions are merely exemplary embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A manufacturing method of a display substrate, comprising:
    forming a first planarization layer on a base substrate on which a patterned film layer is formed;
    forming a first buffer layer on a side, away from the base substrate, of the first planarization layer;
    forming a second buffer layer on a side, away from the base substrate, of the first buffer layer; and
    forming a Wire Grid Polarizer (WGP) on a side, away from the base substrate, of the second buffer layer; and
    wherein prior to forming the first buffer layer on the side, away from the base substrate, of the first planarization layer, the method further comprises:
        forming a second planarization layer on the side, away from the base substrate, of the first planarization layer, wherein the second planarization layer and the first planarization layer are made from different materials; and
    wherein after forming the second planarization layer on the side, away from the base substrate, of the first planarization layer, the method further comprises:
        performing ashing on a side, away from the base substrate, of the second planarization layer to reduce a contact angle between the second planarization layer and the first buffer layer.

2. The method according to claim 1, wherein the first buffer layer and the second buffer layer are made from different materials.

3. The method according to claim 2, wherein the material for forming the first buffer layer comprises silicon nitride, and the material for forming the second buffer layer comprises silicon dioxide.

4. The method according to claim 1, wherein forming the second planarization layer on the side, away from the base substrate, of the first planarization layer comprises:
    coating the side, away from the base substrate, of the first planarization layer with a planarization material; and
    curing the planarization material to form the second planarization layer.

5. The method according to claim 4, wherein the material for forming the first planarization layer comprises a resin material, and the planarization material for forming the second planarization layer comprises a fluorine-containing resin material.

6. The method according to claim 1, wherein forming the WGP on the side, away from the base substrate, of the second buffer layer comprises:
    forming a conductive thin film on the side, away from the base substrate, of the second buffer layer;
    forming a hard mask on a side, away from the base substrate, of the conductive thin film;
    coating a side, away from the base substrate, of the hard mask with an imprint resist;
    imprinting the imprint resist with a nano imprint template to form an imprint pattern; and
    etching the hard mask and the conductive thin film based on the imprint pattern, and stripping the residual hard mask to form the WGP.

7. The method according to claim 1, wherein after forming the WGP on the side, away from the base substrate, of the second buffer layer, the method further comprises:
    forming a protective layer on a side, away from the base substrate, of the WGP.

8. The method according to claim 1, wherein the patterned film layer is a color film layer.

9. The method according to claim 6, wherein the patterned film layer is a color film layer, the first planarization layer is made from a resin material, the first buffer layer is made from silicon nitride, and the second buffer layer is made from silicon dioxide;
    before forming the first buffer layer on the side, away from the base substrate, of the first planarization layer, the method further comprises:
    coating the side, away from the base substrate, of the first planarization layer with a planarization material which is a fluorine-containing resin material;
    photocuring the planarization material to form the second planarization layer;
    after forming the WGP on the side, away from the base substrate, of the second buffer layer, the method further comprises: forming a protective layer on the side, away from the base substrate, of the WGP.

10. A display substrate, comprising:
    a patterned film layer on a base substrate and a first planarization layer on a side, away from the base substrate, of the patterned film layer;
    a first buffer layer on a side, away from the base substrate, of the first planarization layer;
    a second buffer layer on a side, away from the base substrate, of the first buffer layer;

a Wire Grid Polarizer (WGP) on a side, away from the base substrate, of the second buffer layer; and a second planarization layer between the first planarization layer and the first buffer layer, wherein the second planarization layer and the first planarization layer are made from different materials; and wherein the second planarization layer is subjected to an ashing process, and a contact angle between the second planarization layer and the first buffer layer is reduced.

11. The display substrate according to claim 10, wherein the first buffer layer and the second buffer layer are made from different materials.

12. The display substrate according to claim 11, wherein the material for forming the first buffer layer comprises silicon nitride, and the material for forming the second buffer layer comprises silicon dioxide.

13. The display substrate according to claim 10, wherein the material for forming the first planarization layer comprises a resin material, and the planarization material for forming the second planarization layer comprises a fluorine-containing resin material.

14. The display substrate according to claim 10, further comprising:

a protective layer on a side, away from the base substrate, of the WGP.

15. The display substrate according to claim 10, wherein the patterned film layer is a color film layer.

16. The display substrate according to claim 13, wherein the patterned film layer is a color film layer, the material for forming the first buffer layer comprises silicon nitride, and the material for forming the second buffer layer comprises silicon dioxide; and the display substrate further comprises: a protective layer on a side, away from the base substrate, of the WGP.

17. A display device, comprising a display substrate, wherein the display substrate comprises:

a patterned film layer on a base substrate and a first planarization layer on a side, away from the base substrate, of the patterned film layer;

a first buffer layer on a side, away from the base substrate, of the first planarization layer;

a second buffer layer on a side, away from the base substrate, of the first buffer layer; and a Wire Grid Polarizer (WGP) on a side, away from the base substrate, of the second buffer layer; and a second planarization layer between the first planarization layer and the first buffer layer, wherein the second planarization layer and the first planarization layer are made from different materials; and wherein the second planarization layer is subjected to an ashing process, and a contact angle between the second planarization layer and the first buffer layer is reduced.

* * * * *